(12) United States Patent
Schneider

(10) Patent No.: US 8,057,122 B2
(45) Date of Patent: Nov. 15, 2011

(54) ASSEMBLY UNIT

(75) Inventor: Wilhelm Schneider, Rednitzhembach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 12/258,813

(22) Filed: Oct. 27, 2008

(65) Prior Publication Data

US 2009/0110478 A1 Apr. 30, 2009

(30) Foreign Application Priority Data

Oct. 26, 2007 (DE) .................. 10 2007 051 678
Feb. 26, 2008 (DE) .................. 10 2008 011 271

(51) Int. Cl.
*F16D 1/00* (2006.01)

(52) U.S. Cl. .................... 403/408.1; 411/107

(58) Field of Classification Search ............. 403/408.1; 411/353, 107, 999
See application file for complete search history.

(56) References Cited

U.S. PATENT DOCUMENTS

| | | | | |
|---|---|---|---|---|
| 4,975,008 A * | 12/1990 | Wagner | ........... | 411/337 |
| 5,199,152 A * | 4/1993 | Wagner | ........... | 29/444 |
| 5,244,325 A * | 9/1993 | Knohl | ........... | 411/353 |
| 5,462,395 A * | 10/1995 | Damm et al. | ........... | 411/107 |
| 5,782,595 A * | 7/1998 | Schneider | ........... | 411/352 |
| 5,807,052 A * | 9/1998 | Van Boven et al. | ........... | 411/353 |
| 5,871,319 A * | 2/1999 | Schneider | ........... | 411/107 |
| 6,044,536 A * | 4/2000 | Schneider | ........... | 29/437 |
| 6,227,783 B1 * | 5/2001 | Salameh | ........... | 411/353 |
| 6,227,784 B1 * | 5/2001 | Antoine et al. | ........... | 411/369 |
| 6,280,132 B1 * | 8/2001 | Szczukowski et al. | ........... | 411/353 |
| 6,309,156 B1 * | 10/2001 | Schneider | ........... | 411/353 |
| 6,309,157 B1 * | 10/2001 | Amann et al. | ........... | 411/353 |
| 6,420,652 B1 * | 7/2002 | Byczek | ........... | 174/58 |
| 6,585,468 B2 * | 7/2003 | Johnson et al. | ........... | 411/353 |
| 6,702,503 B2 * | 3/2004 | Pinzl | ........... | 403/200 |
| 2002/0106257 A1* | 8/2002 | Braun et al. | ........... | 411/353 |
| 2003/0194292 A1* | 10/2003 | Deeg et al. | ........... | 411/353 |
| 2003/0205014 A1* | 11/2003 | Schneider | ........... | 52/364 |

FOREIGN PATENT DOCUMENTS

DE 29620397 5/1998
DE 19654848 C2 1/2001

\* cited by examiner

*Primary Examiner* — Joshua Kennedy
(74) *Attorney, Agent, or Firm* — Venable LLP; Robert Kinberg; Steven J. Schwarz

(57) ABSTRACT

An assembly unit attachable to a base structure has at least one assembly part with a through opening and at least one fastener with a radially expanded head and a shaft that is provided with a fastening section extends through the through opening and is held captive therein. The shaft is encircled by a sleeve and the head of the fastener projects in a radial direction over the sleeve. Two stop elements project from the outer circumferential surface of the sleeve. An axial catch projects from the wall of the through opening. The axial catch and the stop elements are embodied such that they can be moved past each other in axial direction. The axial catch inside the through opening and the second stop element on the outer circumferential surface are respectively arranged in an axial position. The fastening section is arranged in a specific axial position relative to the surface of the assembly part that is facing away from the head.

12 Claims, 16 Drawing Sheets

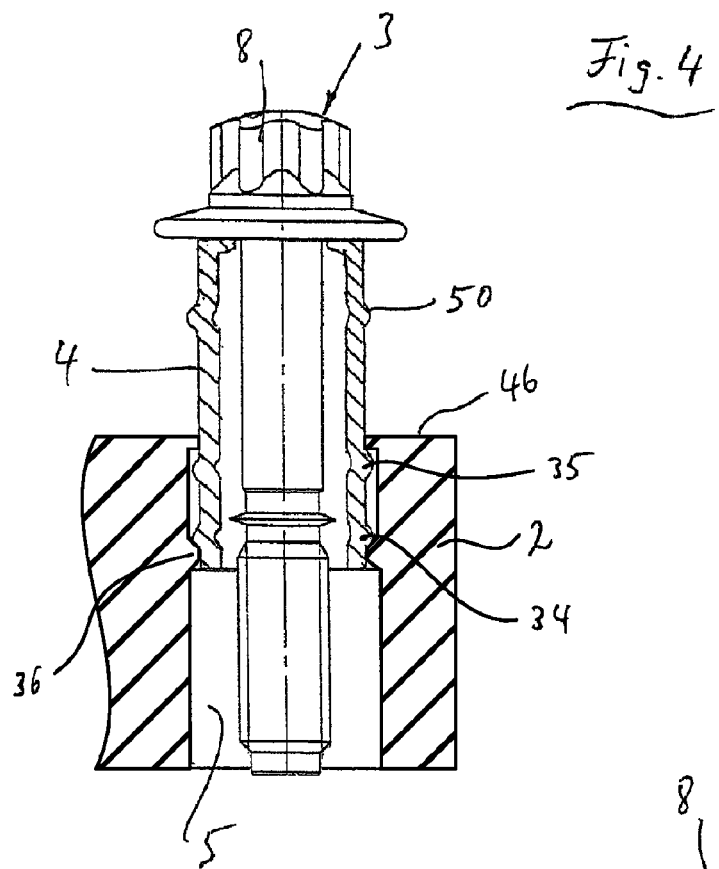
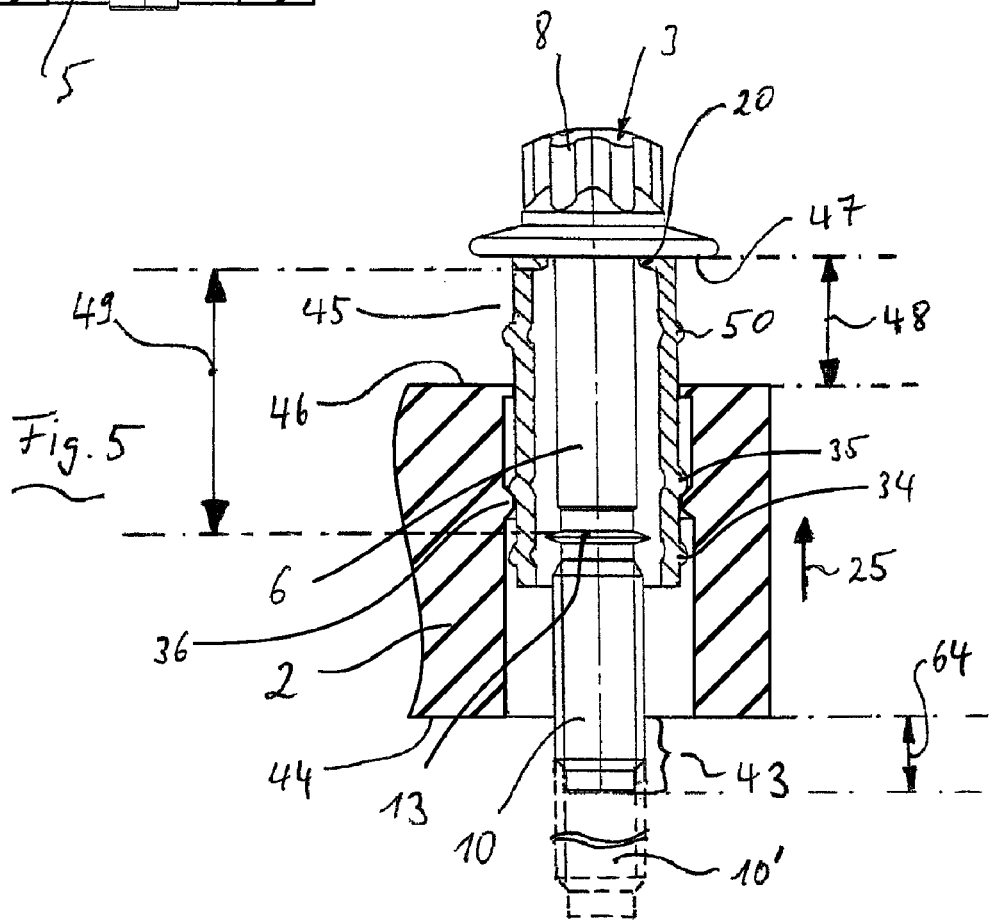

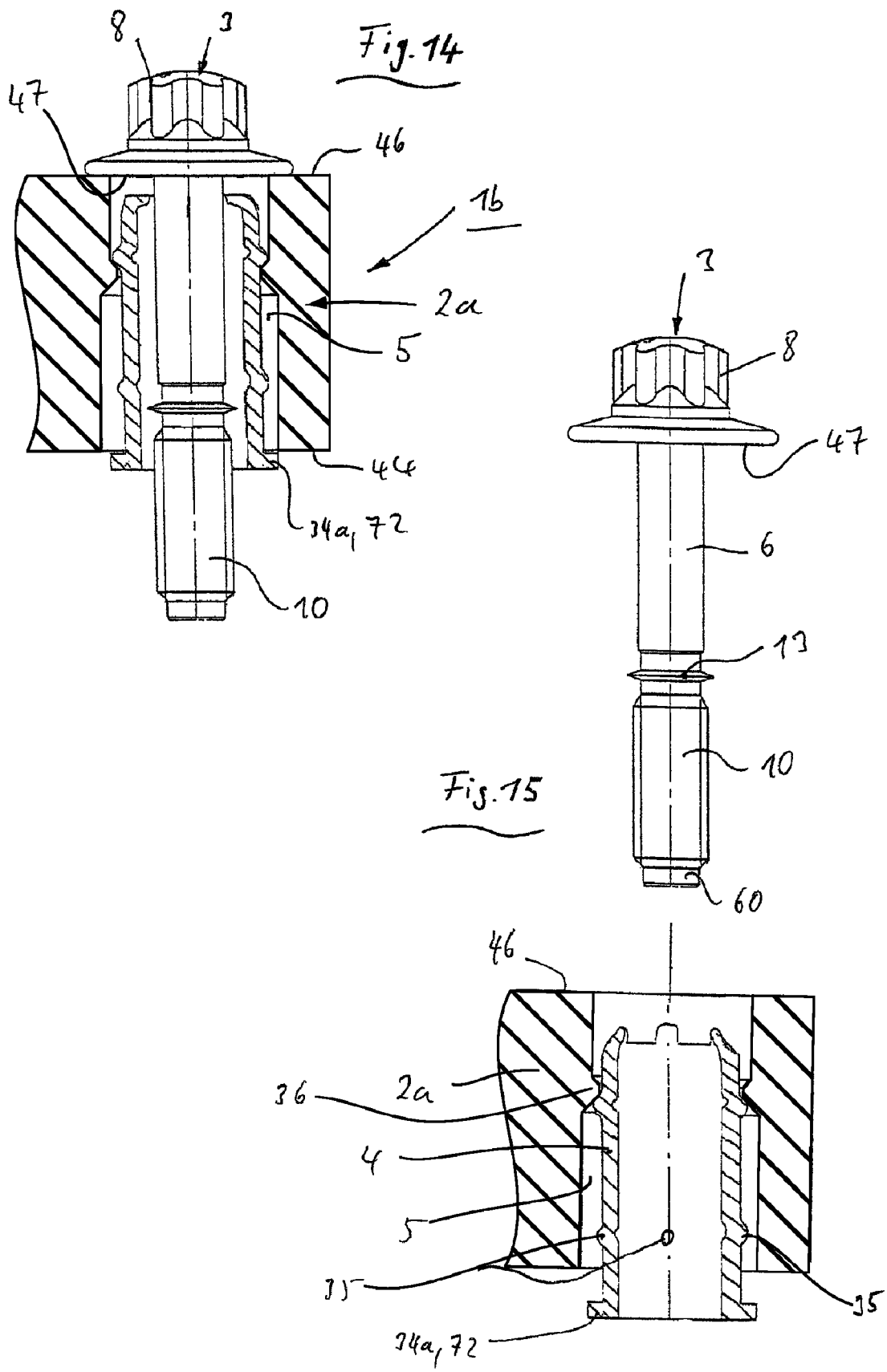

ASSEMBLY UNIT

CROSS-REFERENCE TO RELATED APPLICATION

This application claims the priority of the German Patent Applications DE 10 2007 051 678.0, filed on Oct. 26, 2007 and DE 10 2008 011 271.2, filed on Feb. 26, 2008, the contents of both application being incorporated herein in their entirety.

BACKGROUND OF THE INVENTION

The present invention relates to an assembly unit that can be attached to a base structure, the assembly unit comprising an assembly part provided with at least one through opening and at least one fastener consisting of a radially expanded head and a shaft that extends through the opening and is held captive with axial mobility therein, wherein this shaft has a fastening section on the end that is removed from the head. Assembly units of this type are known from the German patent documents DE 196 54 848 C2 and DE 296 20 397 U1.

During the assembly, an assembly part of this type is moved toward the base structure, wherein the fastening sections, which can be supplied from above during an assembly, will project from the bottom of the through opening for reasons of gravity. If the assembly part is supplied essentially parallel to the center longitudinal axis of the fasteners, then the fasteners and/or their fastening sections are pushed back into the through openings once they hit the assembly surface of the base structure. In some assembly situations, however, the fastening sections that can still project from the through openings can cause problems, for example when they get snagged on edges or projections of the base structure. With a base structure having two assembly surfaces that are inclined toward each other and one assembly part with correspondingly angled counter surfaces, the fasteners are admitted with a force arriving at an angle to their longitudinal extension when they impact with the assembly surfaces, thereby obstructing or even preventing a pushing back into the through opening. This problem also occurs if the assembly unit is supplied to the base structure from a direction that extends at an angle to or is parallel at a short distance to its assembly surface, for example for space reasons.

The assembly part frequently consists of a relatively flexible material as compared to the base structure, e.g. a plastic material. As a result of using an elastic material for the assembly part, the pre-tensioning force required for a secure connection cannot be achieved with the fastener because, in the fully assembled state, the fastener only supports itself on the assembly part, which would consequently be compressed and deformed in an impermissible manner.

SUMMARY OF THE INVENTION

Starting with this problem definition, it is an object of the present invention to provide an assembly unit, which is easy to handle and is also suitable for securing assembly parts of relatively elastic materials.

This object is solved with an assembly unit of the aforementioned type, having the following additional features: The region of the fastener shaft is provided with a circumferential surface around its center longitudinal axis that is facing away from it, from which surface two stop elements project that are respectively arranged at an axial distance to the head and an axial distance to each other, meaning a first end stop element and, at a shorter distance to the head, a second end stop element. The circumferential surface for a first embodiment can be located on a sleeve surrounding the shaft, as will be explained in further detail below, whereas the circumferential surface for a second embodiment is located directly on the shaft. When using a sleeve, the circumferential surface is located on the outside of the sleeve. If no sleeve is used, then the outer surface of the fastener shaft is the circumferential surface. The fastener and a possibly existing sleeve are held captive inside the through opening of the assembly part, so as to be movable in axial direction.

Projecting from the wall of the through opening is an axial catch, or blocking element, which has an inside diameter that is smaller than the outside diameter for the stop elements. The axial catch and the stop elements are embodied such that they can be moved past each other in axial direction while experiencing elastic or elastic and plastic deformation, such as is the case with an assembly part made of plastic and stop elements made of metal. If a stop element is moved past the axial catch, which can be shaped like a circumferential ring-type projection, only a relatively small force is required for deforming the axial catch during the passage of the stop element. The axial catch inside the through opening and the first stop element on the circumferential surface assigned to the fastener shaft are respectively arranged axially in such an axial position that in a pre-assembly position, for which the second stop element fits against a stop surface of the axial catch that faces the head, the fastening section of the fastener is arranged in a specific axial position relative to the surface on the assembly part that is facing away from the head, meaning its assembly surface. In addition to the aforementioned pre-assembly position, the fastener can also be positioned in a different and fully assembled position, for which the second stop element is located on the axial catch side that is facing away from the head. Finally, the fastener also has a support surface for supporting itself on the base structure in the fully assembled state. In the case of the first modification, the support surface is the front side of the sleeve, which faces away from the fastener head. In the case of the second modification, the support surface is arranged on the fastener shaft. In the fully assembled state, the pre-tensioning force required for pre-tensioning the fastener shaft is therefore introduced via the shaft or the sleeve—and less via the assembly part—into the base structure. The assembly part can therefore consist of a relatively soft and/or elastic, meaning flexible, material.

According to a preferred embodiment of the two modifications, a partial region of the fastening section projects in the pre-assembled position from the assembly surface, which—as will be shown later on—is advantageous when attaching the assembly unit to the base structure. In the above-mentioned cases, the projecting partial region of the fastening section for all practical purposes does not hinder the assembly in any way.

BRIEF DESCRIPTION OF THE DRAWINGS

These and other features and advantages of the invention will be further understood from the following detailed description of the preferred embodiments with reference to the accompanying drawings, showing in:

FIGS. 3 to 5 Illustrations showing the configuration of the assembly unit according to FIG. 1;

FIG. 14 An assembly unit that essentially corresponds to the assembly unit according to FIG. 12, but for which the sleeve is embodied such that it cannot slide out of the assembly part;

FIG. 15 A drawing illustrating the assembly of the assembly unit according to FIG. 14;

DETAILED DESCRIPTION

Figure 1:
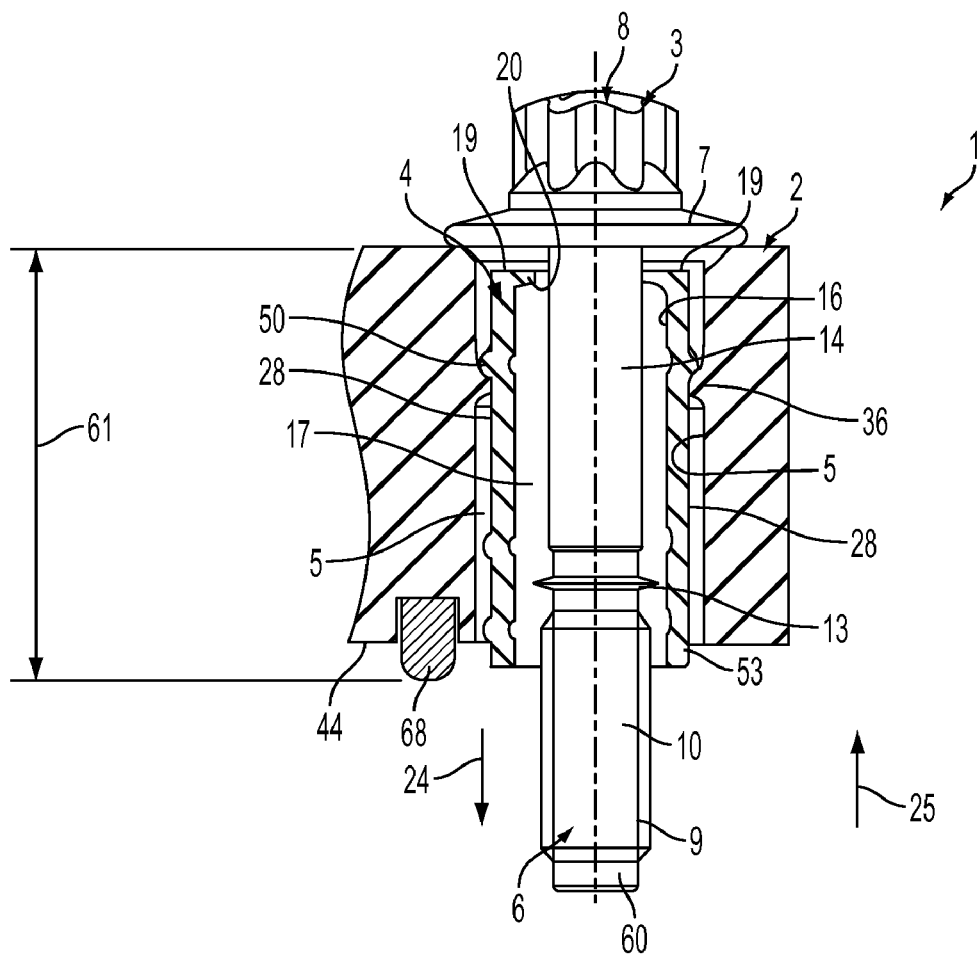
FIG. 1 A partial sectional view of a first embodiment of a modified assembly unit, which consists of a fastener in the form of a screw and a sleeve surrounding the shaft of the screw.
Figure 2:
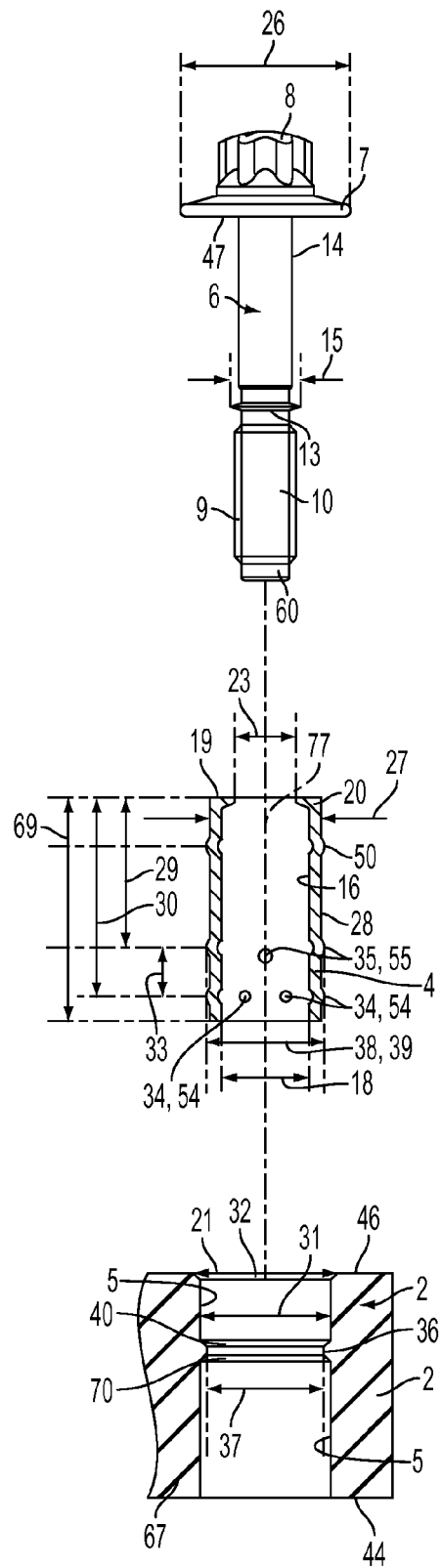
FIG. 2 The individual parts of the assembly unit according to FIG. 1.
Figure 17:
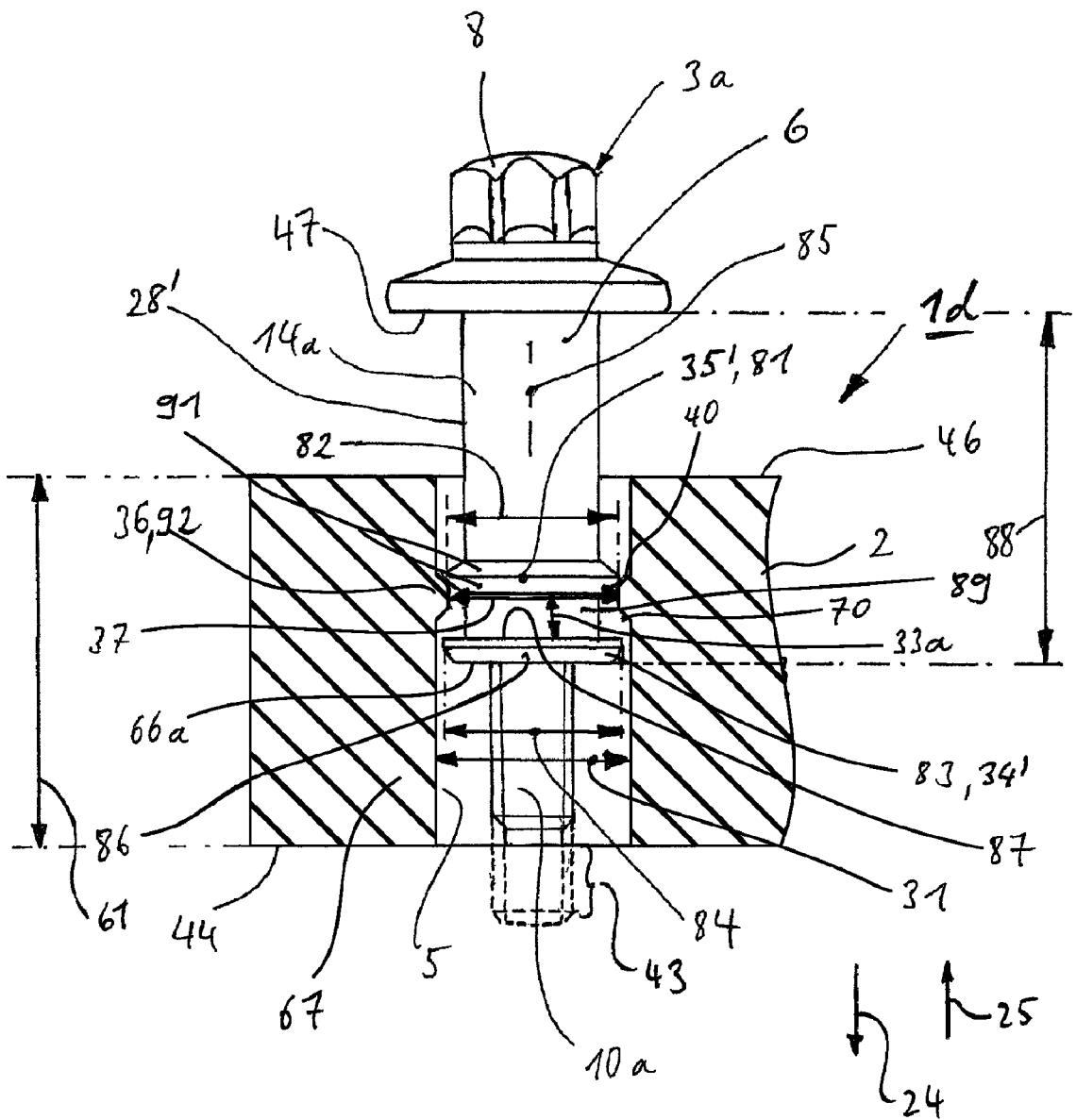
FIG. 17 A second modified embodiment of an assembly unit.
Figure 18:
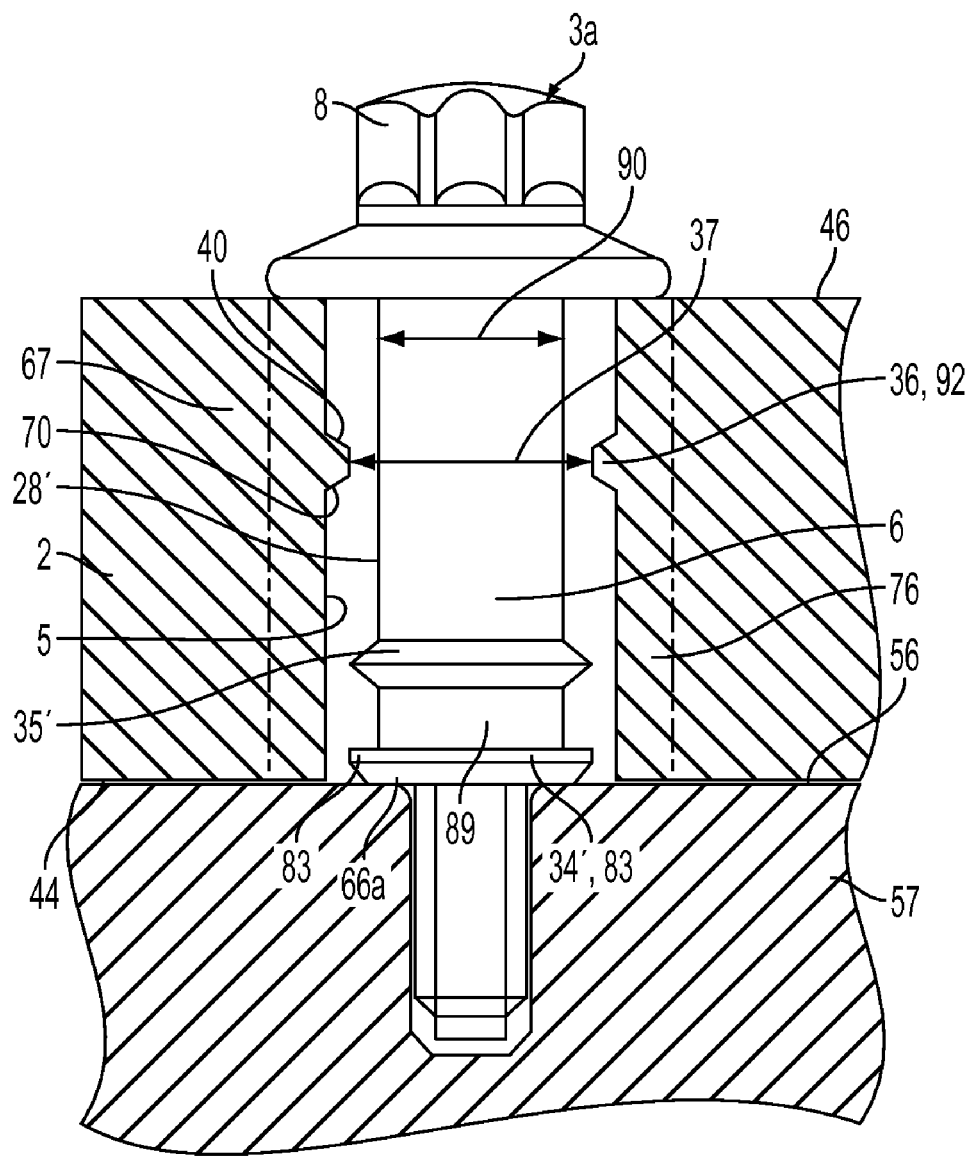
FIG. 18 The assembly unit according to FIG. 17, in combination with a base structure.

The detailed views of the assembly units 1, shown in the various Figures, all comprise an assembly part 2 and at least one fastener 3, wherein the latter is provided with a sleeve 4 except in the case of the embodiment shown in FIGS. 17 and 18. All embodiments show that at least one through opening 5 extends through the assembly part 2, which can be a cylinder head cover, wherein the fastener 3 in turn extends through this opening, either with or without a sleeve 4. The fastener 3 takes the form of a screw with shaft 6, provided at one end with a head 8 that radially projects with a flange 7 over the shaft 6. The fastening section 10 that is provided with a threat 9 is located at the other end of the shaft 6. A ring-shaped bulge 13 is arranged on the shaft 6 between the head 8 and the fastening section 10. The shaft section 14 between the ring-shaped bulge 13 and the head 8 is not threaded. The outside diameter 15 (FIG. 2) of the ring-shaped bulge 13 is dimensioned such that it projects radially over the fastening section 10 as well as over the non-threaded shaft section 14.

With the embodiments according to FIGS. 1 to 16 (first embodiment variant), the essentially cylindrical sleeve 4 encircles the shaft 6 on the fastener 3 at a radial distance 17, meaning a ring-shaped gap exists between the inside 16 of the sleeve 4 and the shaft 6, at least with a coaxial alignment of the aforementioned parts. The inside 16 of the sleeve 4 is essentially cylinder-shaped and has an inside diameter 18 that is larger than the outside diameter 15 of the ring-shaped bulge 13. Projections 20, which point radially toward the inside and are distributed over the circumference of the sleeve, are provided in the frontal region 19 of the sleeve 4, near the head 8. The top side of the projections 20, facing the head 8, is aligned with the front 19. The inside diameter 23 of the projections 20 and/or an imaginary inside circle, formed with these projections, is smaller than the outside diameter 15 of the ring-shaped bulge 13. In this way, the sleeve 4 is held captive against the fastener in an axial direction 24 that points away from the head 8. In the direction counter to the axial direction 25, the sleeve 4 is held by the flange 7 of the head 8, the outside diameter 26 of which is larger than the outside diameter 27 of the sleeve 4, larger than the inside diameter 31 of a section of the through opening 5 that extends away from the top surface 46 of the assembly part 2, and larger than the maximum inside diameter 21 of a lowering cone 32 that adjoins the aforementioned section and opens in the direction of the top 46 of the assembly part 2. Two stop elements, namely a first stop element 34 and a second stop element 35, which project from the circumferential surface 28 of the sleeve 4 are respectively arranged at an axial distance 29, 30 to the front 19 of the sleeve 4 that is located near the head and are also arranged at an axial distance 33 to each other. The axial distance 29 of the second end stop 35 in this case is shorter than the axial distance 30 of the first stop element 34. The aforementioned stop elements cooperate with an axial catch 36 that radially projects from the inside wall of the through opening 5. This catch is embodied as ring-shaped circumferential projection with an inside diameter 37 that is smaller than a maximum outside diameter 38, 39 for the stop elements 34, 35 and/or an imagined circumference encircling these end stops. The axial catch 36 thus projects in axial direction radially over the stop elements 34, 35, so that a form-fitting connection can be achieved in this way, which is effective in one or the other axial direction 24, 25, between the sleeve 4 and the assembly part 2.

The first stop element 34 is used for the captive holding of the sleeve 4 inside the through opening 5 in the direction counter to the axial direction 25. The sleeve 4 can be pulled in the aforementioned direction out of the through opening 5, but only far enough so that the first stop element 34 comes to rest against the side 70 of the axial catch 36, which is far from the head. The second stop element 35 functions to determine a pre-assembly position (FIG. 5) for the sleeve 4 in the assembly part 2. In this position, the second stop element 35 rests on a stop surface 40 of the axial catch 36, which faces the head 8 of the fastener 3. The axial position of the axial catch 36 in the through opening 5 and the axial position of the second end stop 35 on the sleeve 4 are selected such that in the pre-assembly position only a partial region 43 of the fastener shaft 6 projects from the assembly surface 44, facing away from the head 8, on the assembly part 2. In the pre-assembly position, the sleeve 4 projects with an overhand 45 from the top side 46, facing the head 8, of the assembly part 2. Starting with the situation shown in FIG. 1, for which the head 8 rests with its surface 47, located on the underside of the flange 7, on the top side 46 of the assembly part 2, the fastening section 10 of the fastener 3 that projects from the through opening 5 can be displaced by pushing the sleeve 4 in the pre-assembly position for a distance into the through opening 5 and/or displacing it relative to the assembly part 2, wherein this distance corresponds to the length 48 of the overhand 45 (FIG. 5). However, the shaft 6 and/or its fastening section 10 can be displaced even further by the distance 49 in counter-axial direction 25, meaning into the through opening 5, starting with the situation shown in FIG. 5. The shaft can be displaced far enough, so that the ring-shaped bulge 13 on the shaft 6 hits the projections 20 arranged in the frontal region 19 of the sleeve 4, which is close to the head, thus resulting on the whole in a possible displacement distance for the fastener 3, which is composed of the length 48 and the distance 49. Owing to the aforementioned embodiment, it is possible to ensure a submerging of the fastening section 10 in the through opening 5, even for assembly parts 2 with low thickness and/or in the case of fasteners with very long fastening sections 10' (see FIG. 5).

As previously mentioned, the captive securing of the sleeve 4 on the fastener 3 in axial direction 24 is ensured by the interaction between the ring-shaped bulge 13 and the projections 20. If no additional stop element would be provided on the sleeve 4, then the sleeve, starting with the situation shown in FIG. 1, would slide far out of the through opening 5 (see FIG. 13). To prevent this, the sleeve 4 is provided with a third stop element 50 that radially projects from its circumferential surface 28, wherein this stop element is arranged between the second stop element 35 and the front 19 on the sleeve 4, which is close to the head. The axial position of the third stop element 50 is selected such that the sleeve 4 does not project or only with a slight extension 53 from the assembly surface 44 of the assembly part 2.

Figure 3:
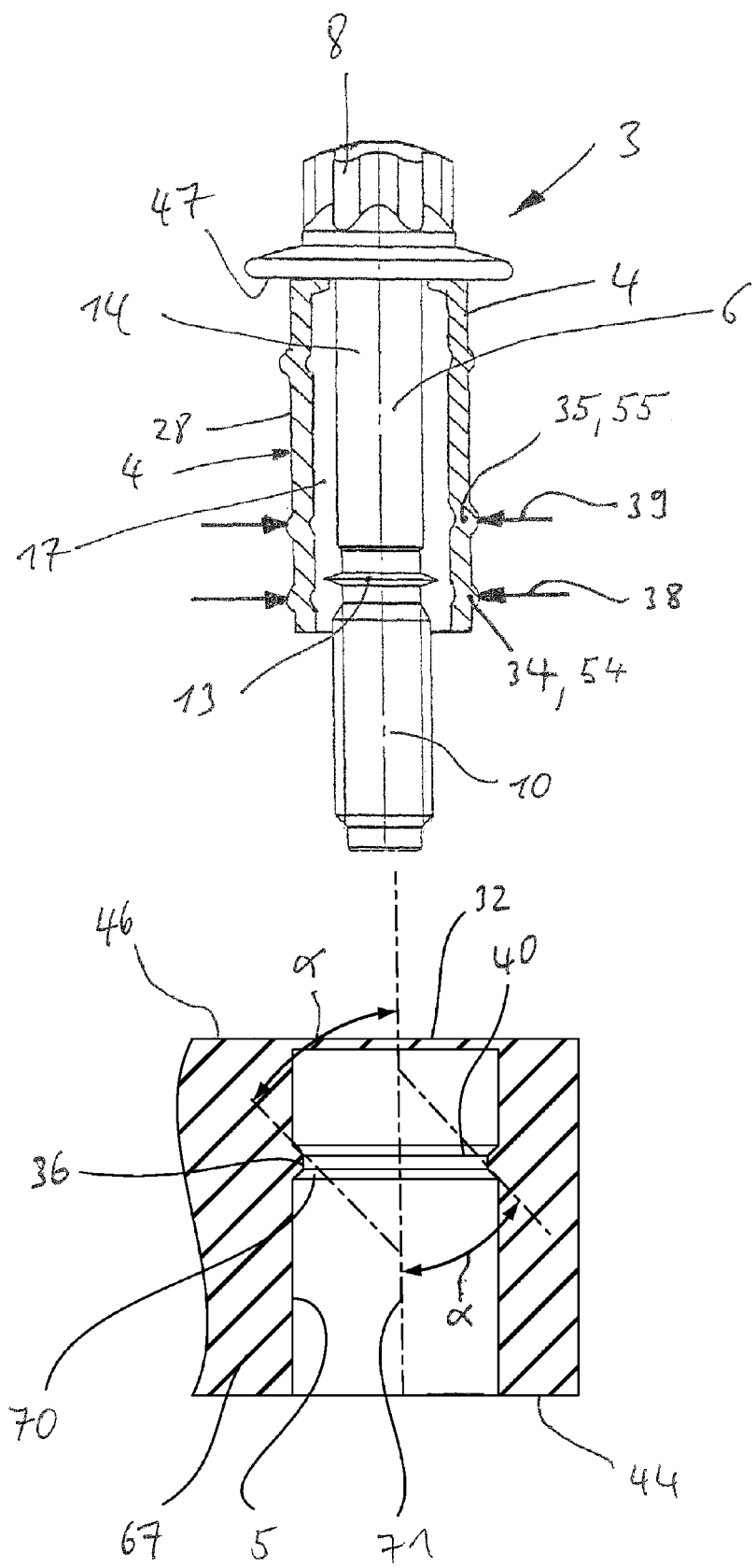

The fasteners 3 for the assembly part 2 come already pre-assembled with captive mounted sleeves 4 (FIG. 3, top). A fastener 3 of this type is then inserted from the top 46 of the assembly part 2 into the through opening 5. In the process, both stop elements 34, 35 must be moved past the axial catch 36, so that the sleeve 4 can be pushed into the position in the through opening 5, shown in FIG. 1. To make this possible without requiring an excessive axial force and without destroying the elements that must be moved past each other, the stop elements 34, 35 and the axial catch 36 are embodied accordingly. For example, it is conceivable to select an inside diameter 37 of the axial catch 36 that it is only slightly smaller than the outside diameters 38, 39 of the stop elements 34, 35. For the present embodiments, the stop elements 34 and 35 are formed by several individual projections 54, 55 that are distributed across the circumference of the sleeve. The force required for moving the stop elements 34, 35 past the axial catch 36 is thus reduced. Of course, it is also possible to have an embodiment for which the axial catch 36 is formed by individual projections and the stop elements 34, 35 are respectively formed by a circumferential ring-shaped projection.

When providing the assembly part 2 with fasteners 3, a fastener is pushed far enough into the through opening 5 to be in the pre-assembly position, wherein the second stop element 35 comes to rest against the stop surface 40 of the axial catch 36. The axial distance 33 between the two stop elements 34, 35 is at least long enough so that the axial catch 36 can be located in-between. The fastener is in the pre-assembly position (FIG. 5) for the state, in which a unit 1 pre-assembled with fasteners 3 is transported and delivered to an assembly line. The axial mobility of the sleeve 4 inside the through opening 5 is provided by the axial spacing 33 between the stop elements 34, 35, reduced by the axial dimensions of the axial catch 36.

Figure 6:
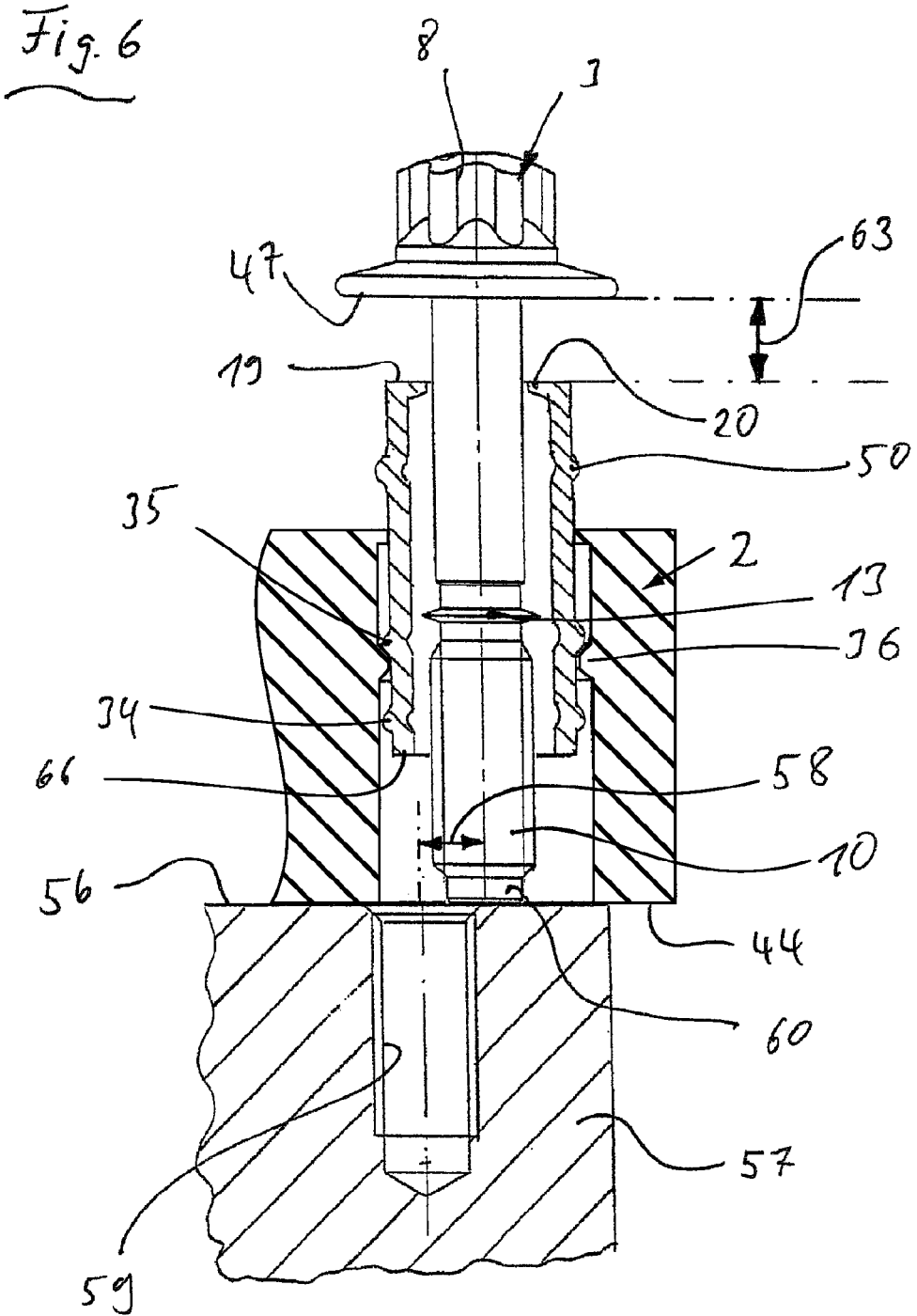
FIG. 6 to 9 A series of images showing the fastening of an assembly unit to a base structure.
Figure 7:
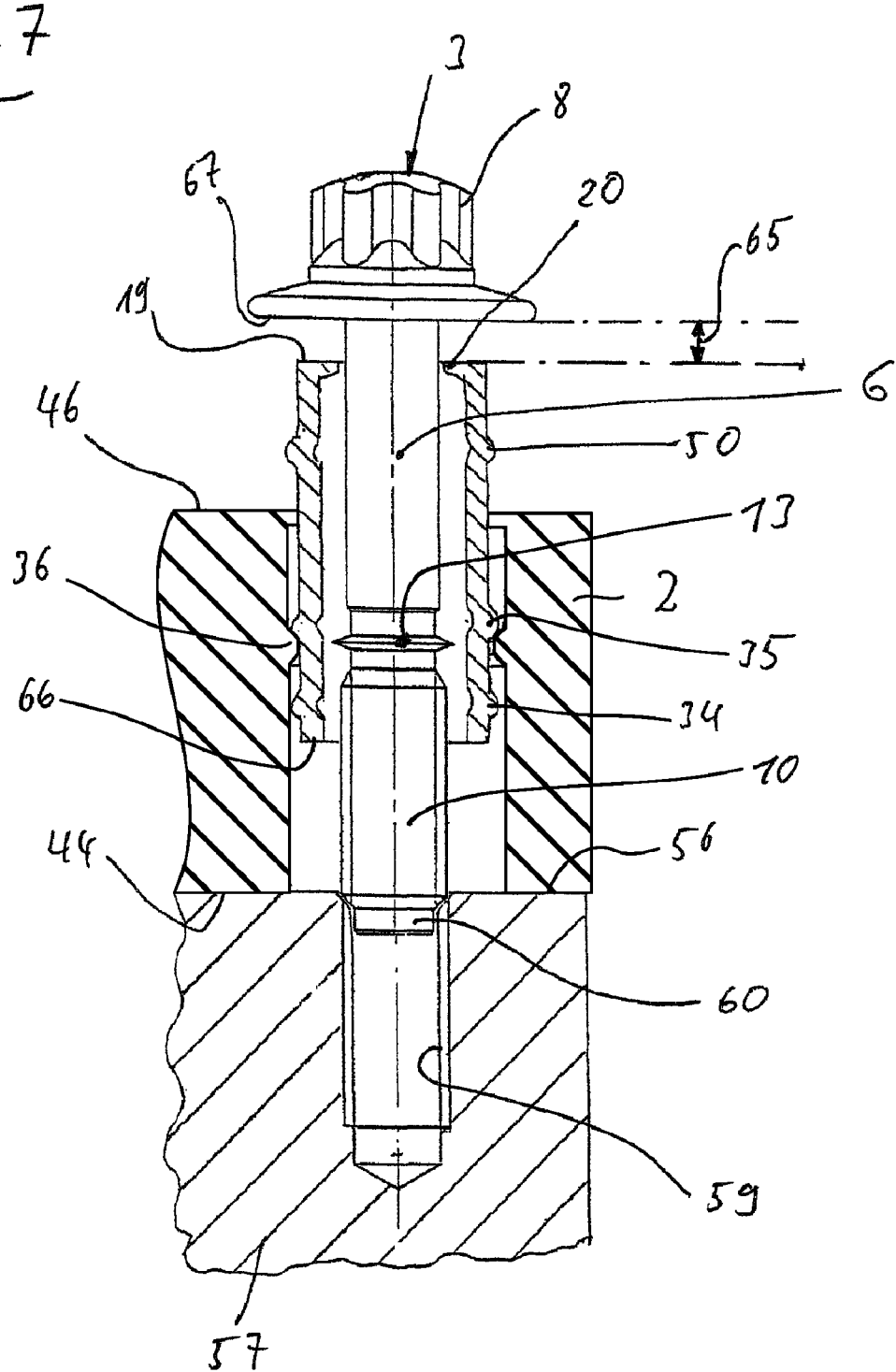
Figure 8:
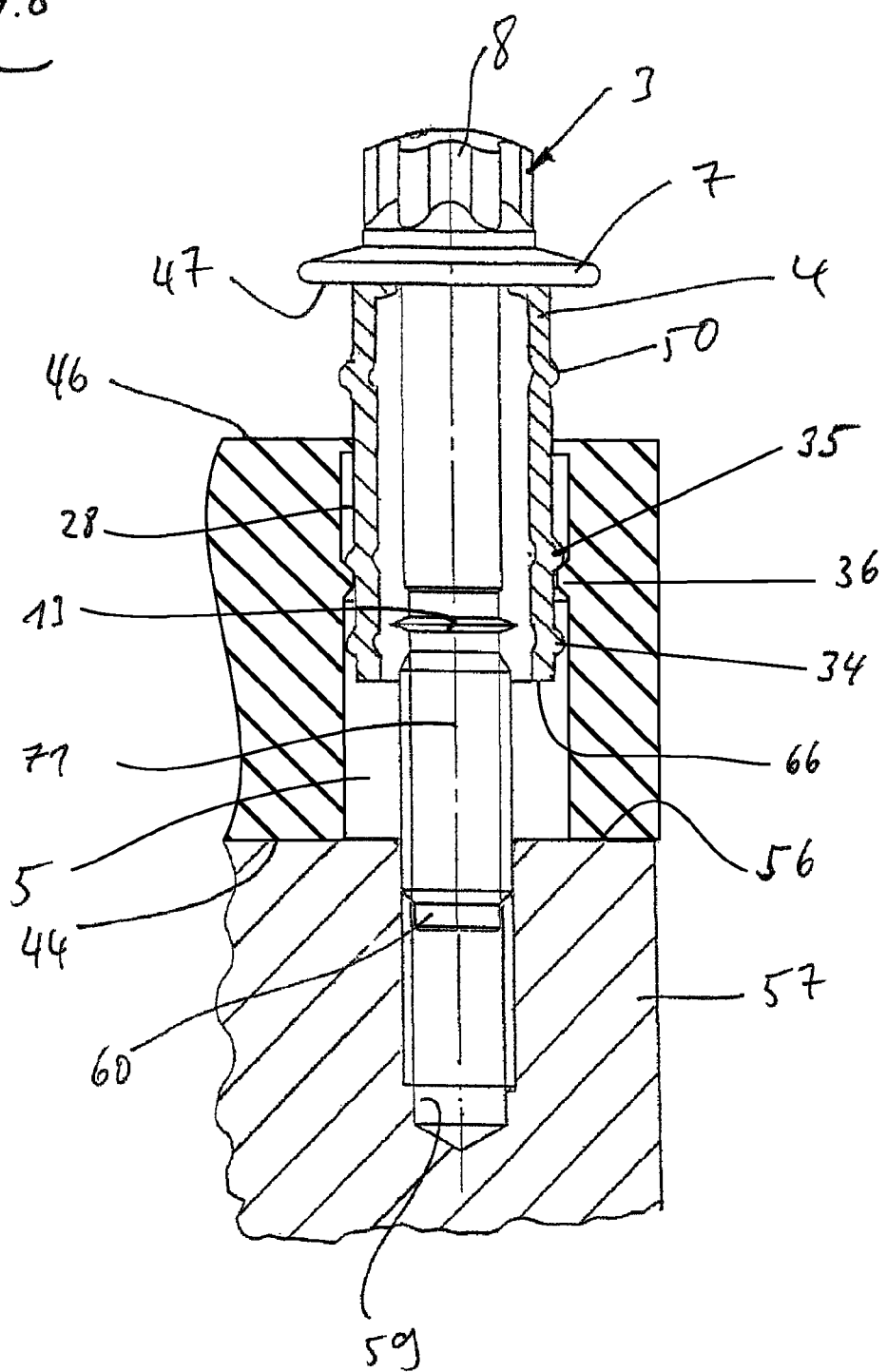

To attach the assembly unit 1 to a base structure 57 (FIGS. 6-8), the unit is initially moved toward the base structure 57, wherein only a practically non-interfering partial region 43 of the fastening section 10 of the fastener 3 projects from the assembly surface 44 of the assembly part 2 (FIG. 5). If the assembly surface 44 fits flat against the counter-assembly surface 56 of the base structure 57, then a possibly still existing axial offset 58 of a threaded bore 59 of the base structure 57 is compensated relative to the center longitudinal axis 71 of the through opening 5 (FIG. 6), so that the fastening section 10 can slide into the threaded bore 59 with a search tip 60 or can be inserted into it. When the shaft 6 for the fastener impacts with the counter-assembly surface 56 of the base structure 57, then the fastener 3 is lifted up by a distance 63 (FIG. 6), which corresponds to the length 64 of the partial region 43 that projects from the assembly part 2 in the pre-assembly position, shown in FIG. 5. Owing to the fact that the fastening section 10 rests with its search tip 60 inside the threaded bore 59, the axial distance between the head 8 and the sleeve 4 is reduced, so that the distance 63, existing in the state according to FIG. 6, is reduced to the axial distance 65 (FIG. 7). The fastening section 10 can then be screwed into the threaded bore 59 by a distance corresponding to the axial distance 65, before the head 8 comes to rest with its surface 47 on the front 19 of the sleeve 4. Starting with this moment only (FIG. 8), the second stop element 35 is moved past the axial catch 36 by further screwing the fastener 3 into the threaded bore 59. In the state shown in FIG. 8, the anchoring of the fastening section 10 inside the threaded bore 59 has progressed far enough, so that it can withstand the axial forces required for overcoming the axial catch 36. If a projecting partial region 43 is not provided, then the axial catch 36 is overcome by applying an axial force to the head 8 of the fastener 3.

Figure 9:
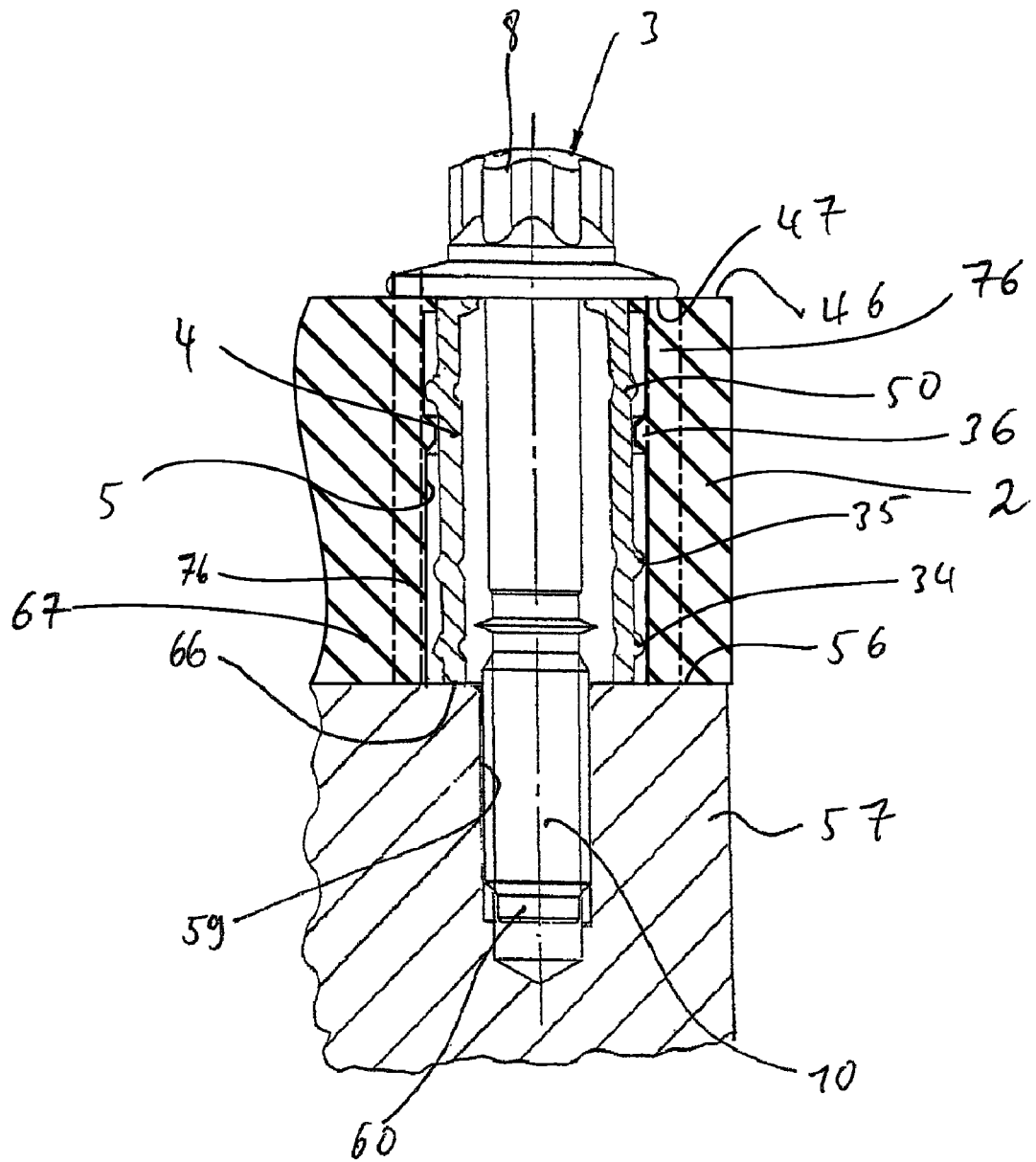

In the fully assembled state shown in FIG. 9, the sleeve 4 supports itself with the aid of the frontal section removed from the head, the support surface 66, on the counter-assembly surface 56 of the base structure 57. Since the assembly part 2 in a region 67 (FIG. 2) that surrounds the through opening 5 has a certain excess dimension and/or thickness 61, if applicable including a sealing element 68 on the assembly surface 44 (shown as example in FIG. 1), relative to the length 69 of the sleeve 4, the assembly part 2 is axially compressed by a specific measure in the overlap region 76, which is admitted with a force by the head 8 of the fastener 3 and is thus also pressed with this force against the counter-assembly surface 56 of the base structure 57. The main force is here exerted via the sleeve 4, which supports itself with its support surface 66 on the counter-assembly surface 56.

Owing to the different functions for the first and second stop element 34, 35, these are embodied differently. As a result, the axial force for moving the first stop element 34 in counter-axial direction 25 past the axial catch 36 is higher than the corresponding axial force needed for the second axial element 35 because, during the transport and delivery to an assembly line, the fastener 3 must be held reliably against the assembly part 2, which is preferably achieved by using a larger number of individual projections 54 for the first stop element 34 than for the second stop element 35. It means that the latter can be moved with less force expenditure in axial direction 24 as well as in counter-axial direction 25 past the axial catch 36. For example, this is the case when starting with the situation shown in FIG. 8 the assembly unit 1 must be attached to a base structure 57 by moving the second stop element 35 past the axial catch 36. In the case of the second stop element 35, this element must also pass by the axial catch 36 in counter-axial direction 25. In the event that an assembly unit 1 must be attached gas-tight or liquid-tight to a base structure 57, a test of the seal is realized prior to delivery. For this, the assembly unit 1 is screwed to a text apparatus, in the same way as it is screwed to a base structure 57, or it is pressed with the aid of the fastening elements, meaning the fasteners 3 and the sleeve 4, against the test apparatus. Following the testing of the seal, the assembly unit 1 is again removed from the testing apparatus and the sleeve 4 is returned to the pre-assembly position shown in FIG. 5, wherein the second stop element 35 of a sleeve 4 must move past the axial catch 36 in counter-axial direction 25. It is therefore advantageous that only a relatively low force must be expended in the case of the second stop element 35 in both axial directions 24, 25 to move past the axial catch 36. To ensure this, the axial catch 36 and/or the ring-shaped circumferential projection that forms is embodied axial-symmetrical, so that the side 70 of the fastener 3 that is facing away from the head 8 and the previously mentioned stop surface 40 that is facing the head 8 are embodied as slanted surfaces which respectively enclose approximately the same acute angle $\alpha$ together with the center longitudinal axis 71 of the through opening 5. If different through (penetration) forces are desired for this case, or in connection with another stop element, in both axial directions for moving past the undercut between a stop element 34, 35, 50 and the axial catch 36, then the axial catch 36 can be embodied non-symmetrical, for example by allowing its surfaces that cooperate with a stop element during the passage to occupy different slanted positions, relative to the center longitudinal axis 71 of the through opening 5. A different force for overcoming the frictional connection between a stop element 34, 35 and the axial catch 36 can also be generated by varying the inside diameter 37 of the axial catch and/or the outside diameter of a stop element 34, 35, 50, as well as by using different width dimensions for the individual projections in circumferential direction if the stop elements 34, 35 are formed by individual projections.

Figure 10:
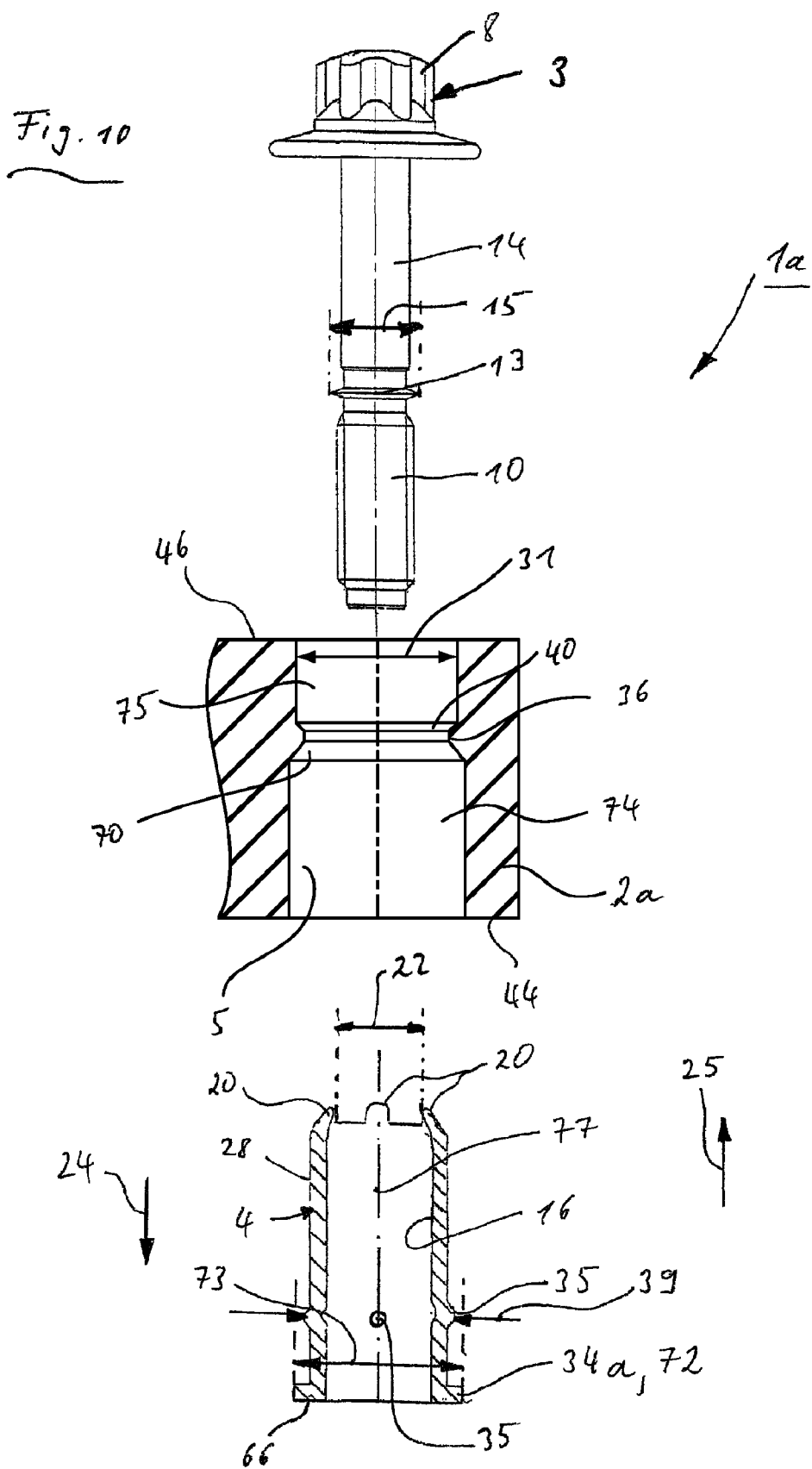
FIG. 10 A modified assembly unit, showing a partial sectional view that is enlarged.
Figure 11:
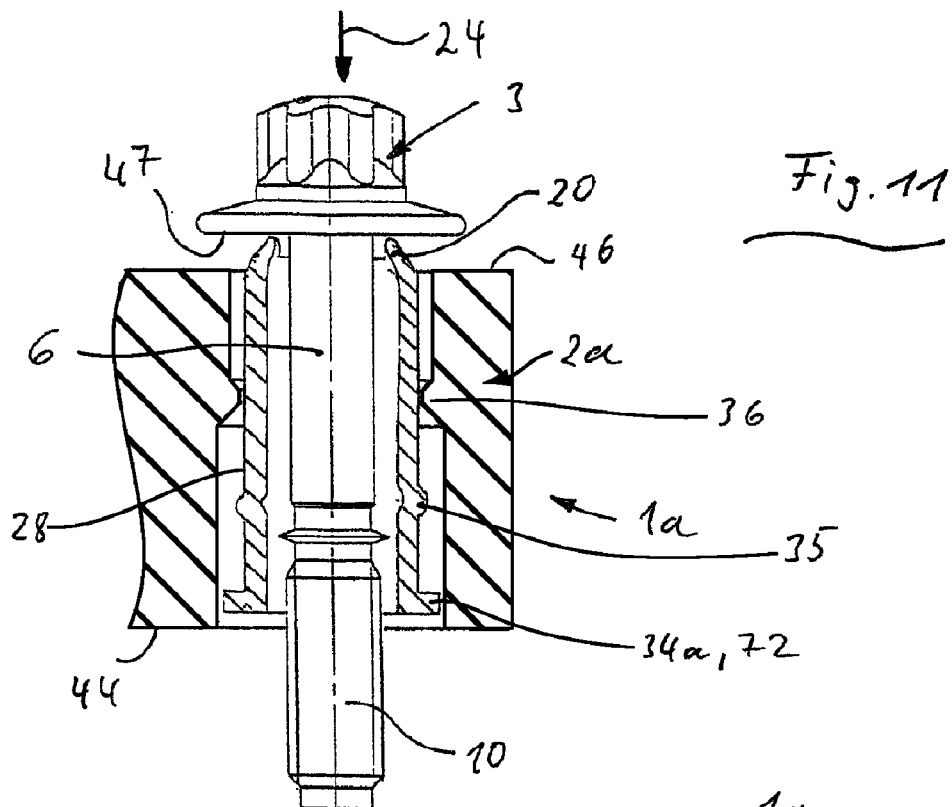
FIGS. 11, 12, and 12a Three images showing the assembly of the unit according to FIG. 10.
Figure 12:
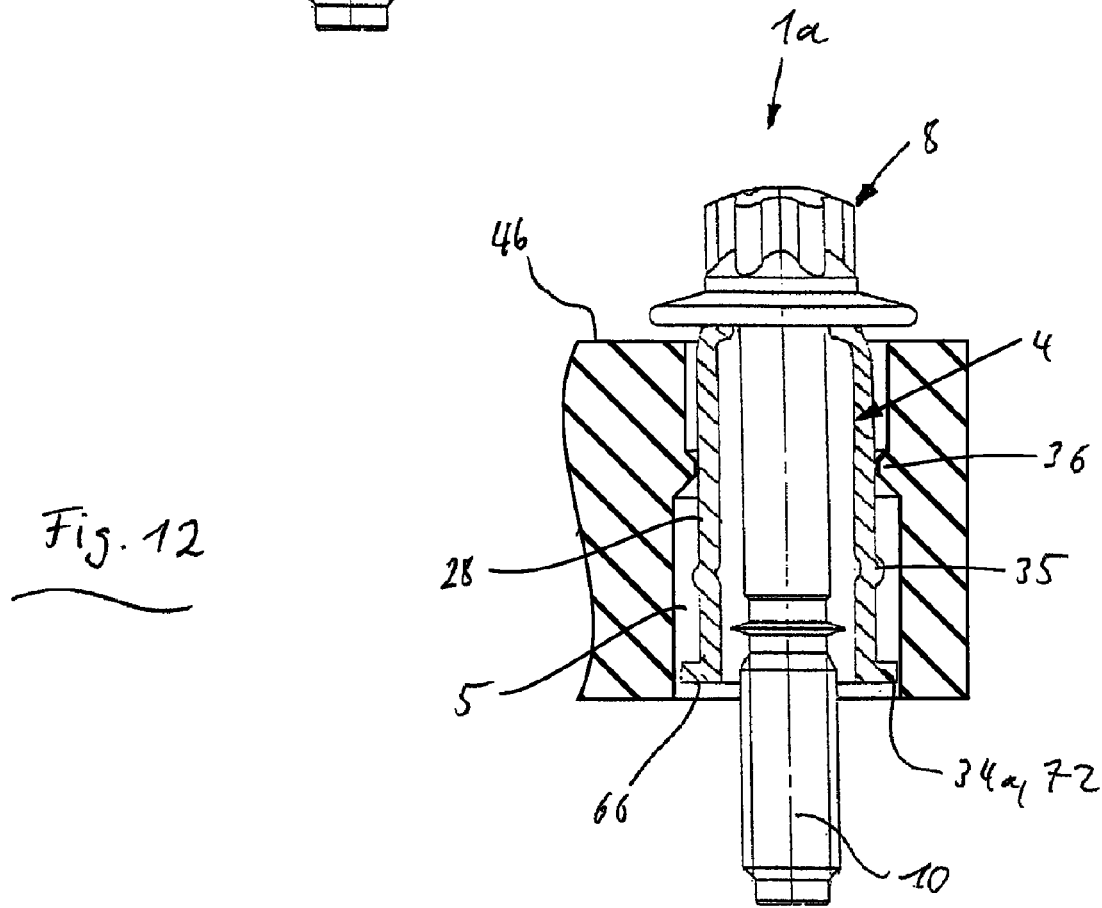
Figure 12A:
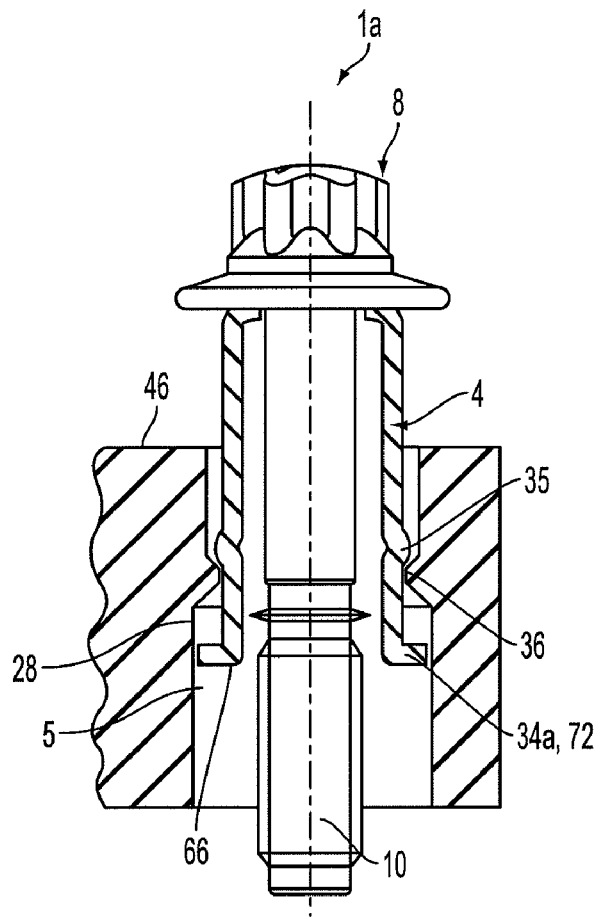
Figure 13:
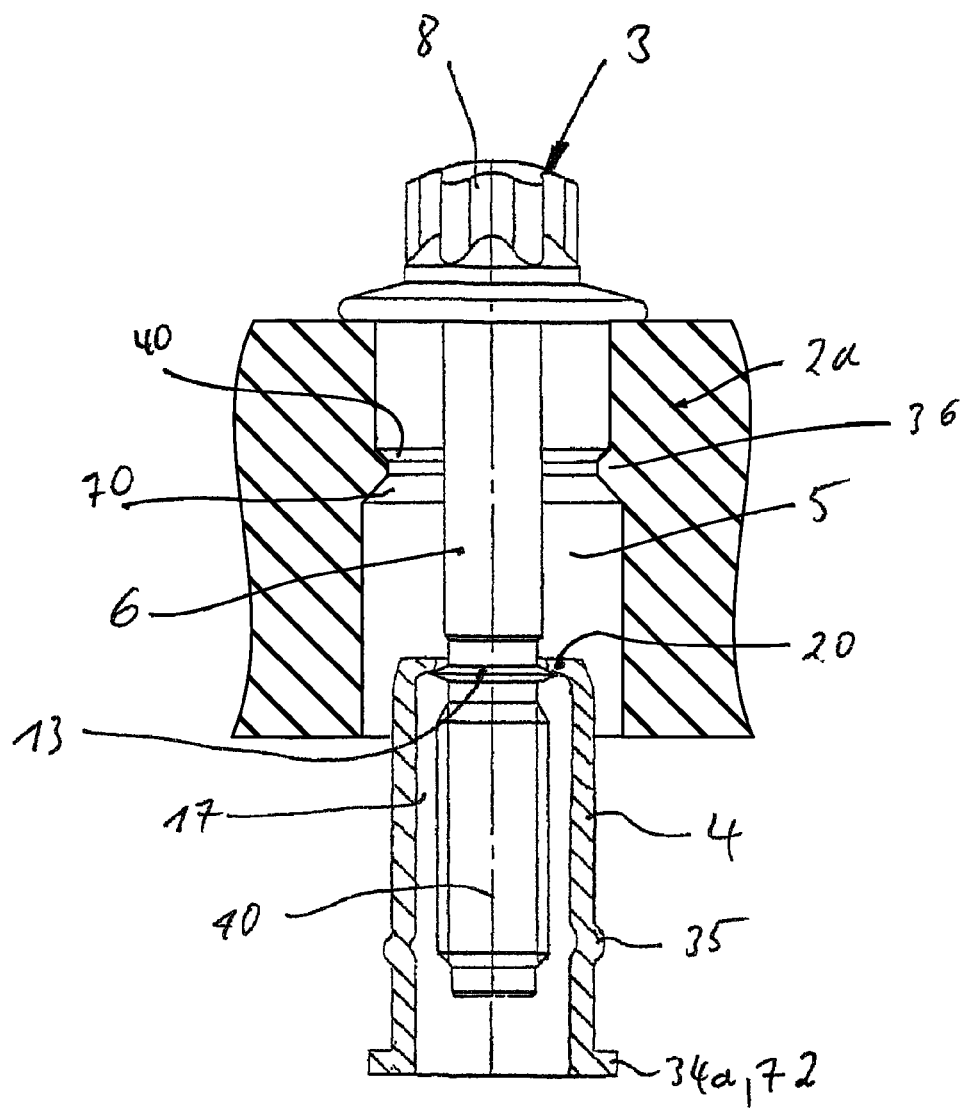
FIG. 13 The assembly unit according to FIG. 12, wherein the sleeve has slid out of the assembly part.

For the embodiment shown in FIGS. 10 to 13, the first stop element 34a is a radially outward extending flange 72, which is formed onto the end of the sleeve 4 that is far from the head. The side of this flange, which is facing away from the head 8, forms the support surface 66. The sleeve 4 in the fully assembled position rests with this support surface against the counter assembly surface 56 of the base structure 57. The flange 72 projects over the second stop element 35 in radial direction and has an outside diameter 73 that is thus larger than the outside diameter 39 of the second stop element 35. Accordingly, the flange 72 requires more space in radial direction, meaning the through opening 5 of the assembly part 2a must have a larger diameter as compared to the above-described embodiment. However, this would result in having to use a fastener 3 with a correspondingly enlarged head 8, which would again require more material expenditure. To avoid this, only the longitudinal section 74 of the through opening 5 that extends in axial direction 24 away from the axial catch 36 is adapted to the outside diameter 73 of the flange 72. The longitudinal section 75 of the through opening 5, which extends away from the axial catch 36 in counter-axial direction 25, on the other hand, is designed to be narrower, meaning it has a smaller diameter 31. Thus, the fastener 3 for the above-described embodiment can be used even with an assembly part 2a, provided the overlap region 76 (FIG. 9) between the flange 7 on the head 8 and the top 46 of the assembly part 2a remains the same. FIG. 12a depicts a pre-assembly position where the second stop element 35 rests against a stop surface of the axial catch 36 that is facing the head 8.

As a result of the first stop element 34a and/or the flange 72 projecting relatively far from the circumferential surface 28 of the sleeve 4, a fastener 3 already provided with a sleeve 4 can hardly be inserted into the through opening 5 in the same way as described in the above, meaning from the top 46 of the assembly part 2. The sleeve 4 is thus inserted from the side of the assembly surface 44 and the fastener 3 is inserted from the other side of the assembly part 2 into the through opening 5, wherein the captive connection between the sleeve 4 and the fastener 3 is established only then. FIG. 10 shows that sleeves 4 are used, for which the projections 20 on the side toward the head do not yet have the later radial orientation, but extend at angle upward toward the center longitudinal axis 77 of the sleeve 4. The clear diameter 22 that is encircled by the projections 20 is thus larger than the outside diameter 15 of the ring-shaped bulge 13 on the shaft 6. Once the position as shown in FIG. 11 is reached, the sleeve 4 is held in this position with a suitable retaining tool (not shown herein), and the fastener 3 is admitted with a force in axial direction 24. As a result, the projections are bent radially toward the inside by the head 8 and the axially effective undercut between the projections and the ring-shaped bulge 13 is thus produced.

For the transport and delivery of the assembly unit 1a in question to an assembly line, the sleeve 4 is again in the pre-assembly position as shown in FIG. 5. The state shown in FIG. 13 exists, for example, following the above-described sealing test or following a dismantling of an assembly unit 1a for repair. To prevent the sleeve 4 from sliding out of the through opening according to FIG. 13, the sleeve 4 of the assembly unit 1a can also be provided with a third stop element 50, as shown with the embodiment of an assembly unit 1b in FIGS. 14 and 15. The assembly of the unit 1b takes place in the same way as described for the assembly unit 1a (FIGS. 10 to 13).

Figure 16:
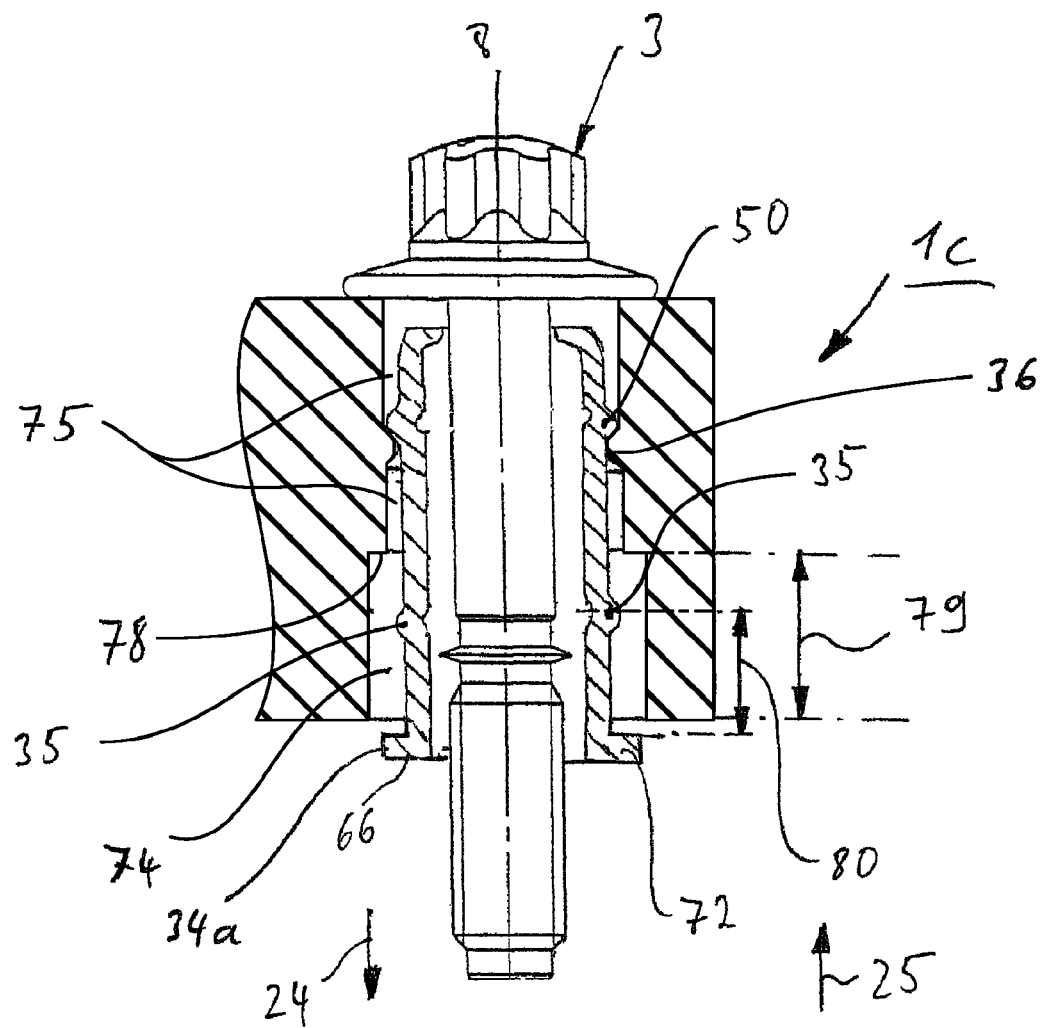
FIG. 16 An assembly unit having a modified assembly part as compared to the one shown in FIG. 14.

FIG. 16 shows an assembly unit 1c, which differs from the assembly unit 1b (FIGS. 14 and 15), in that the narrowed down longitudinal section 75 of the through opening 5 in the assembly part 2c is extended in axial direction 24, wherein the axial catch 36 is arranged in this section. The narrowed down longitudinal section 75 transitions only at a distance to the axial catch 36 into the expanded longitudinal section 74, via a radial shoulder 78. The length 79 of the expanded longitudinal section 74 and/or the axial distance 80 between the flange 72 and the second stop element 35 is dimensioned such that the sleeve 4 can assume the pre-assembly position (FIG. 5), without interference by the flange 72 that impacts with the radial shoulder 78.

A second design variant for an assembly unit 1d is shown in FIGS. 17 and 18, for which the fastener 3a does not comprise a sleeve. The first stop element 34' and the second stop element 35' in this case are arranged on the circumferential surface 28' of the fastener shaft 6. The first stop element 34' is a flange 83 that radially projects over the shaft 6. This flange has a side facing away from the head 8, which extends at a right angle to the center longitudinal axis 85 and/or extends in a radial plane of the shaft 6 and which, in the fully assembled state, forms a support surface 66a that comes to rest against the base structure 57. The main frictional connection in this case is not via a sleeve, but via the shaft 6, and more precisely via its fastening section 10a and the flange 83. The second stop element 35' is a ring-shaped bulge that projects from the circumferential surface 28'. The outside diameter 84 of the flange 83 corresponds to the outside diameter 82 of the second stop element 35'.

In the same way as for the above-described assembly units, the through opening 5 is essentially cylinder-shaped, with an inside diameter 31, and is also provided with an axial catch 36 that projects from the inside wall of the through opening 5. However, this catch is not a circumferential ring-shaped projection, as is the case with the above-described assembly units, but consists of several individual projections 92 that are distributed in circumferential direction of the through opening 5. The clear inside diameter 37, encircled by these projections, is smaller than the outside diameter 82 of the second stop element 35' and smaller than the outside diameter 84 of the flange 83. Both the shaft section 89 that extends between the first stop element 34' and the second stop element 35' and the shaft section 14a that extends from the second stop element 35' to the head 8 have a larger diameter 90 than the fastening section 10. The stop elements can thus be produced easier, e.g. with a roller operation, since the amount of material required for forming the radially outward projecting elements is lower than for a shaft with lower thickness.

To attach a fastener 3a to an assembly part 2, this fastener is inserted from the top 46 into the through opening 5, wherein the flange 83 and/or the first stop element 34' impact with the axial catch 36. To ensure that little force is needed to move the flange 83 past the axial catch 36 and bring the fastener 3a into the pre-assembly position, a longitudinal section of the flange 83 that faces away from the head 8 is conically tapered, meaning it has a circumferentially slanted surface 86 which cooperates with the also slanted stop surface 40 on the side facing the head 8 of the axial catch 36. The side 87 facing the head 8 of the flange 83 extends at a right angle to the center longitudinal axis 85 of the fastener 3a. This type of design requires an increased force to move the flange 83 in counter-axial direction 25 past the axial catch 36. Accordingly, the reliability of the captive attachment of the shaft 3a on the assembly part 2 is increased. On the other hand, the second stop element 35' that is embodied as ring-shaped bulge has an axial-symmetrical design, meaning it has two slanted surfaces 91 that are slanted toward each other and which cooperate in the same way with the axial catch 36, independent of the respective axial direction. The same force is thus essentially required in both axial directions 24, 25 to move the second stop element 35' past the axial catch 36. For a variation of the penetration forces in this case as well as the case of the flange 83 and/or the first stop element 34', we point to the above-described options.

In the fully assembled state shown in FIG. 18, the flange 83 rests with its support surface 66a on the counter assembly surface 56 of the base structure 57. The region 67 of the assembly part 2, which encircles the through opening 5, has a thickness 61 that slightly exceeds the axial distance 88 between the support surface 66a and the support surface 47 of the head 8. Accordingly, the region 76 that is admitted with a force by the head 8 is axially compressed in the fully assembled state and is additionally pressed with this force against the base structure.

It will be understood that the above description of the present invention is susceptible to various modifications, changes and adaptations, and that the same are intended to be comprehended within the meaning and range of equivalents of the appended claims.

What is claimed is:

1. An assembly unit adapted to be attached to a base structure, said assembly unit comprising:
   at least one assembly part with a through opening, and
   at least one fastener with a radially expanded head and a shaft that is provided with a fastening section, that extends through the through opening and is held captive therein, wherein:
   the shaft is encircled by a sleeve and the head of the fastener projects in a radial direction over this sleeve, wherein the frontal surface of the sleeve is at a distance to the head and forms a support surface when in a fully assembled position, which allows the fastener to come to rest on the base structure, wherein a radial distance exists between the sleeve and the shaft,
   the shaft is captivated inside the sleeve with axial mobility,
   the sleeve has an outer circumferential surface that defines two stop elements projecting from the outer circumferential surface, the stop elements arranged at an axial distance relative to each other, the stop elements including a first stop element and at a shorter distance to the head a second stop element, wherein the first stop element and the second stop element are located at fixed axial positions on the sleeve,
   an axial catch projects from the wall of the through opening, the axial catch defining a smaller inside diameter than the outside diameter of the stop elements, wherein the axial catch engages with the two stop elements to retain the sleeve inside the through opening, and the axial catch defines a width along the axial direction that is less than the axial distance between the two stop elements to permit axial sliding of the sleeve while retained within the through opening,
   the axial catch and the stop elements are embodied such that they can be moved past each other in axial direction, under elastic or elastic and plastic deformation,
   the axial catch inside the through opening and the second stop element on the outer circumferential surface are respectively arranged in an axial position, which ensures that when in a pre-assembly position where the second stop element rests against a stop surface of the axial catch that is facing the head, the fastening section is arranged in a specific axial position relative to the surface of the assembly part that is facing away from the head and defines the assembly surface,
   when in the fully assembled position, the second stop element is located on the side of the axial catch that is facing away from the head.

2. The assembly unit according to claim 1, wherein when in the pre-assembly position, a partial region of the fastening section projects from the assembly surface.

3. The assembly unit according to claim 1, wherein for a captive holding of the sleeve inside the through opening, a third stop element projects from the outer circumferential surface of the sleeve, wherein this element is positioned between the second stop element and the end of the sleeve that is near the head.

4. The assembly unit according to claim 1, wherein the first stop element is embodied such that, compared to the second stop element, it can be moved with a higher axial force past the axial catch, in a direction pointing toward the head, meaning the counter-axial direction.

5. The assembly unit according to claim 4, wherein at least one stop element is formed with the aid of several individual projections distributed over the circumference of the sleeve.

6. The assembly unit according to claim 1, wherein the axial catch comprises a ring-shaped projection in circumferential direction.

7. The assembly unit according to claim 1, wherein for the captive holding of the fastener inside the sleeve, a safety element projects from the sleeve inside, which engages in a counter element that projects on the side facing the head from the shaft of the fastener.

8. The assembly unit according to claim 7, wherein the safety element is formed by several projections distributed in circumferential direction of the sleeve, and the counter element is a ring-shaped bulge.

9. The assembly unit according to claim 1, wherein the length of the sleeve is less than the thickness of a region of the assembly part, which encircles the through opening and when in the fully assembled position is admitted with pressure by a support surface on the underside of the head.

10. The assembly unit according to claim 1, wherein the first stop element is a radially outward extending flange, which is formed onto the end of the sleeve that is far from the head and which has a flange side facing away from the head that forms the support surface.

11. The assembly unit according to claim 10, wherein the outside diameter of the flange is larger than the outside diameter of the second stop element, wherein a longitudinal section of the through opening, which extends outward from the assembly surface of the assembly part and holds the flange, is radially expanded as compared to the longitudinal section, which extends outward from the top side of the assembly part.

12. An assembly unit adapted for attachment to a basic structure, said assembly unit comprising:
   an assembly part including an assembly surface and at least one through opening, and
   at least one fastener comprising a radially enlarged head and a shaft with a fixing segment that projects through the through opening and is held captive therein, wherein:
   the fastener is held axially movable inside the through opening, and a circumferential surface is located on the shaft of the fastener or on a sleeve encircling the shaft of the fastener, and the circumferential surface surrounds a center longitudinal axis of the shaft;

a first stop element and a second stop element project from the circumferential surface, spaced apart at an axial distance from one another, wherein the second stop element is located at a shorter distance to the head than the first stop element;

an axial catch projects from the wall of the through opening, the axial catch defining an inside diameter that is smaller than an outside diameter of the stop elements, wherein the axial catch engages with the first stop element or the second stop element to retain the fastener or the sleeve inside the through opening, and the axial catch defines a width along the axial direction that is less than the axial distance between the first stop element and the second stop element to permit axial sliding of the fastener or sleeve while retained within the through opening;

the axial catch and the stop elements are configured to move past one another with elastic or elastic and plastic deformation;

the axial catch and the second stop element are arranged in an axial position with respect to one another wherein during a pre-assembly position, the second stop element rests against a stop surface of the axial catch that faces the head, and the fixing segment is arranged in a predetermined axial position relative to the assembly surface of the assembly part;

in a fully assembled position, the second stop element is located on the side of the axial catch that is facing away from the head; and the fastener includes a support surface that extends at a right angle to its center longitudinal axis, wherein the support surface in the fully assembled position supports the fastener on the basic structure.

* * * * *